United States Patent
Tezuka

(10) Patent No.: US 11,506,568 B2
(45) Date of Patent: Nov. 22, 2022

(54) SYNCHRONIZING DEVICE, SYNCHRONIZATION METHOD AND SYNCHRONIZATION PROGRAM

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 237 days.

(21) Appl. No.: 16/420,316

(22) Filed: May 23, 2019

(65) Prior Publication Data
US 2019/0383701 A1 Dec. 19, 2019

(30) Foreign Application Priority Data

Jun. 15, 2018 (JP) .............................. JP2018-114498

(51) Int. Cl.
*G01M 13/00* (2019.01)
*G05B 19/406* (2006.01)
*G01D 18/00* (2006.01)

(52) U.S. Cl.
CPC ............ *G01M 13/00* (2013.01); *G01D 18/00* (2013.01); *G05B 19/406* (2013.01); *G05B 2219/50235* (2013.01)

(58) Field of Classification Search
CPC ................. G01M 13/00; G05B 19/406; G05B 2219/50235; G05B 23/0221;
(Continued)

(56) References Cited

U.S. PATENT DOCUMENTS 4,656,868 A * 4/1987 Azuma .............. G05B 19/4065
340/680
6,316,903 B1 * 11/2001 Shamoto .............. G05B 19/416
318/700
(Continued)

FOREIGN PATENT DOCUMENTS

JP H08-190412 A 7/1996
JP 2006-260443 A 9/2006
(Continued)

OTHER PUBLICATIONS

Espacenet machine translation, Maekawa Seiseki, "Device for Monitoring Abnormal Consition," JP2010271185A, Dec. 2, 2010 (Year: 2010).*

(Continued)

*Primary Examiner* — Eman A Alkafawi
*Assistant Examiner* — Denise R Karavias
(74) *Attorney, Agent, or Firm* — Studebaker & Brackett PC

(57) ABSTRACT

A synchronizing device includes: a machine data acquisition portion which acquires at least one type of machine data related to operation of a machine in a time series based on first time information; a measurement data acquisition portion which acquires at least one type of measurement data measuring the state of the machine in a time series based on second time information; a first extraction portion which extracts, from any of the machine data, a moment at which a feature set in advance indicating a predetermined event is expressed; a second extraction portion which extracts, from any of the measurement data, a moment at which a feature set in advance indicating the predetermined event is expressed; and an output portion which synchronizes a moment extracted by the first extraction portion and a (Continued)

moment extracted by the second extraction portion, and outputs the machine data and the measurement data.

15 Claims, 3 Drawing Sheets

(58) Field of Classification Search
CPC ...... G05B 19/4183; G05B 2219/37532; G05B 19/4155; G05B 19/0405; G01D 18/00; G01D 21/00; Y02P 90/02; B23Q 17/00
See application file for complete search history.

(56) References Cited

U.S. PATENT DOCUMENTS

| | | | | |
|---|---|---|---|---|
| 6,333,615 | B1* | 12/2001 | Maezawa | G05B 19/404 318/595 |
| 7,904,184 | B2* | 3/2011 | Chaffee | G05B 19/408 700/29 |
| 9,122,265 | B2* | 9/2015 | Terada | G05B 19/186 |
| 2013/0002185 | A1* | 1/2013 | Hosomi | G05B 19/416 318/625 |
| 2013/0212420 | A1* | 8/2013 | Lawson | G05B 19/4185 713/400 |
| 2015/0106041 | A1* | 4/2015 | Bess | G01M 7/00 702/56 |
| 2017/0118539 | A1* | 4/2017 | Lokshin | G11B 27/28 |
| 2018/0095010 | A1* | 4/2018 | Wewers | G01P 3/481 |

FOREIGN PATENT DOCUMENTS

| | | |
|---|---|---|
| JP | 2006-277549 A | 10/2006 |
| JP | 2011-022688 A | 2/2011 |
| JP | 2012-138044 A | 7/2012 |
| JP | 2016-223906 A | 12/2016 |
| JP | 2017-033229 A | 2/2017 |
| JP | 2017-111571 A | 6/2017 |
| JP | 2017-222028 A | 12/2017 |
| WO | 2013/136406 A1 | 9/2013 |

OTHER PUBLICATIONS

Espacenet machine translation, Kaneko Yasuhiro et al., "Monitor Control Device and Method," JP2006260443A, Sep. 28, 2006 (Year: 2006).*
Espacenet machine translation, Furukawa Tomohisa et al., "Control Device, Monitoring System, Control Program, and Recording Medium," JP2017111571A, Jun. 22, 2017 (Year: 2017).*
Machine translation from Espacenet, Holland et al., "A Remote Mine Operations Performance Tracking, Training, Assessment and Enhancement System," AU 2014201924 A1, Oct. 30, 2014 (Year: 2014).*
An Office Action; "Notice of Reasons for Refusal," mailed by the Japanese Patent Office dated Jun. 30, 2020, which corresponds to Japanese Patent Application No. 2018-114498 and is related to U.S. Appl. No. 16/420,316; with English language translation.

* cited by examiner

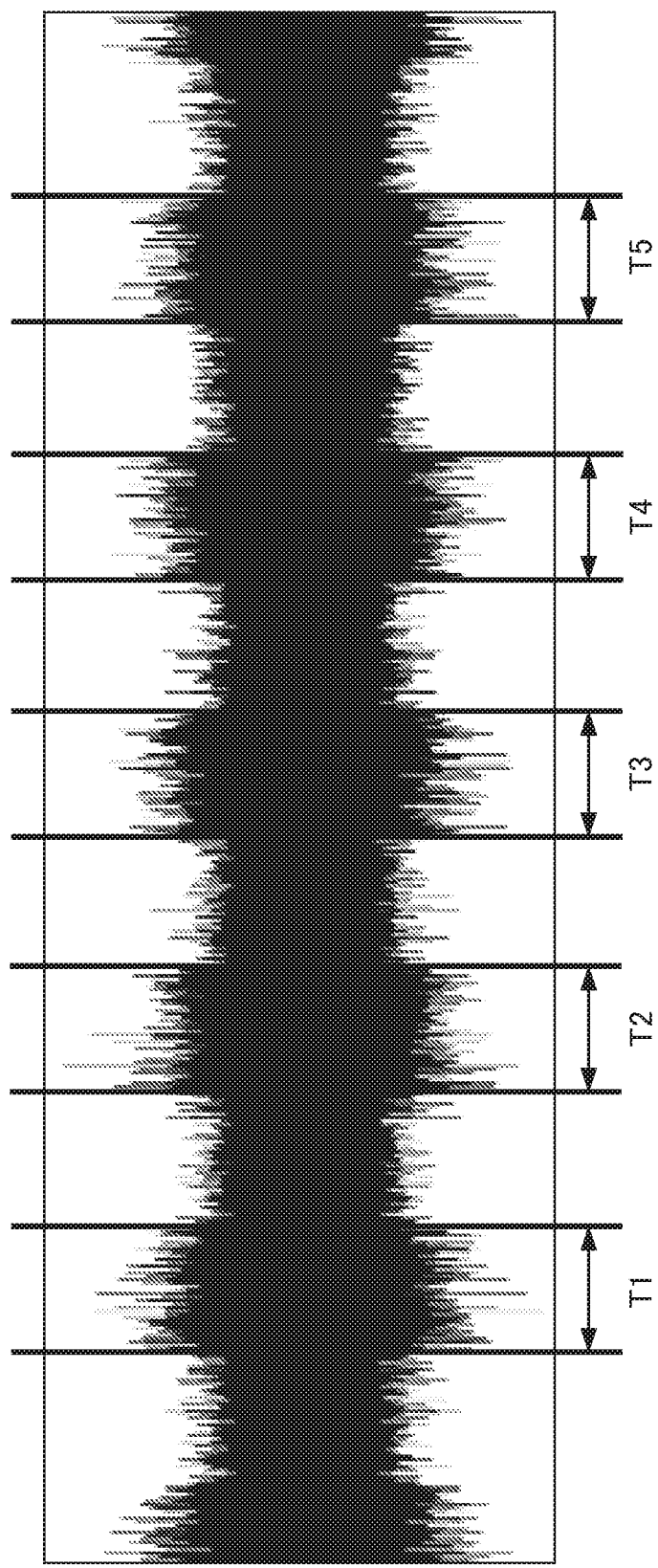

SYNCHRONIZING DEVICE, SYNCHRONIZATION METHOD AND SYNCHRONIZATION PROGRAM

This application is based on and claims the benefit of priority from Japanese Patent Application No. 2018-114498, filed on 15 Jun. 2018, the content of which is incorporated herein by reference.

BACKGROUND OF THE INVENTION

Field of the Invention

The present invention relates to a device, method and program for synchronously outputting a plurality of time series data.

Related Art

In a control device of a machine tool, machine data related to the operation of a machine tool which is the control target, for example, data such as the torque, position and current, is collected by time series (for example, refer to Patent Document 1). In addition, separately from this machine data, in order to detect the state of the machine tool, it is common for sensors such as a vibration sensor or microphone to be provided, and to acquire various types of measurement data (for example, refer to Patent Document 2).

Patent Document 1: Japanese Unexamined Patent Application, Publication No. 2017-222028
Patent Document 2: Japanese Unexamined Patent Application, Publication No. 2016-223906

SUMMARY OF THE INVENTION

However, among the various data to be acquired, the aforementioned machine data and measurement data are acquired by different systems. These systems manage time information independently from each other, and if there is a shift from the actual time, the time stamps of the respective data will not match. Therefore, it has been difficult to analyze this plurality of data by synchronizing the time of this plurality of data.

The present invention has an object of providing a synchronizing device, synchronization method and synchronization program which can synchronize a plurality of types of data of time series.

A synchronizing device (for example, the synchronizing device 1 described later) according to a first aspect of the present invention includes: a machine data acquisition portion (for example, the machine data acquisition portion 11 described later) which acquires at least one type of machine data related to operation of a machine in a time series based on first time information; a measurement data acquisition portion (for example, the measurement data acquisition portion 12 described later) which acquires at least one type of measurement data measuring the state of the machine in a time series based on second time information; a first extraction portion (for example, the first extraction portion 13 described later) which extracts, from any of the machine data, a moment at which a feature set in advance indicating a predetermined event is expressed; a second extraction portion (for example, the second extraction portion 14 described later) which extracts, from any of the measurement data, a moment at which a feature set in advance indicating the predetermined event is expressed; and an output portion (for example, the output portion 15 described later) which synchronizes a moment extracted by the first extraction portion and a moment extracted by the second extraction portion, and outputs the machine data and the measurement data.

According to a second aspect of the present invention, in the synchronizing device as described in the first aspect, a feature which was set in advance indicating the predetermined event may include a value of target data exceeding a predetermined threshold.

According to a third aspect of the present invention, in the synchronizing device as described in the second aspect, the first extraction portion and the second extraction portion, in a case of video data being included in the machine data or the measurement data which are a processing target, may extract from among frames images of the video data a moment of a frame in which a feature that was set in advance indicating the predetermined event is expressed.

According to a fourth aspect of the present invention, the synchronizing device as described in the third aspect may further include a threshold setting portion (for example, the threshold setting portion 16 described later) which sets the threshold, based on the machine data of a time period of the first time information including a moment extracted from video data by the first extraction portion, or the measurement data of a time period of the second time information including a moment extracted from video data by the second extraction portion.

According to the fifth aspect of the present invention, in the synchronizing device as described in any one of the first to fourth aspects, the machine data may include a torque command value.

According to a sixth aspect of the present invention, in the synchronizing device as described in any one of the first to fifth aspects, the measurement data may include acoustic data which indicates a magnitude of sound.

According to a seventh aspect of the present invention, in the synchronizing device as described in any one of the first to sixth aspects, the measurement data may include acceleration data.

A synchronization method according to an eighth aspect of the present invention which is executed by a computer (for example, the synchronizing device 1 described later) includes: a machine data acquiring step of acquiring at least one type of machine data related to operation of a machine in a time series, based on first time information; a measurement data acquiring step of acquiring at least one type of measurement data measuring the state of the machine in a time series, based on second time information; a first extracting step of extracting, from any of the machine data, a moment at which a feature that was set in advance indicating a predetermined event is expressed; a second extracting step of extracting, from any of the measurement data, a moment at which a feature set in advance indicating the predetermined event is expressed; and an outputting step of synchronizing a moment extracted in the first extracting step and a moment extracted in the second extracting step, and outputting the machine data and the measurement data.

A synchronization program according to a ninth aspect of the present invention for causing a computer (for example, the synchronizing device 1 described later) to execute: a machine data acquiring step of acquiring at least one type of machine data related to operation of a machine in a time series, based on first time information; a measurement data acquiring step of acquiring at least one type of measurement data measuring the state of the machine in a time series, based on second time information; a first extracting step of extracting, from any of the machine data, a moment at which a feature that was set in advance indicating a predetermined event is expressed; a second extracting step of extracting, from any of the measurement data, a moment at which a feature that was set in advance indicating the predetermined event is expressed; and an outputting step of synchronizing a moment extracted in the first extracting step and a moment extracted in the second extracting step, and outputting the machine data and the measurement data.

According to the present invention, a plurality of types of data of time series is synchronously outputted.

BRIEF DESCRIPTION OF THE DRAWINGS

FIG. 4 is a view showing a second example of a synchronization method according to the embodiment.

DETAILED DESCRIPTION OF THE INVENTION

Figure 1:
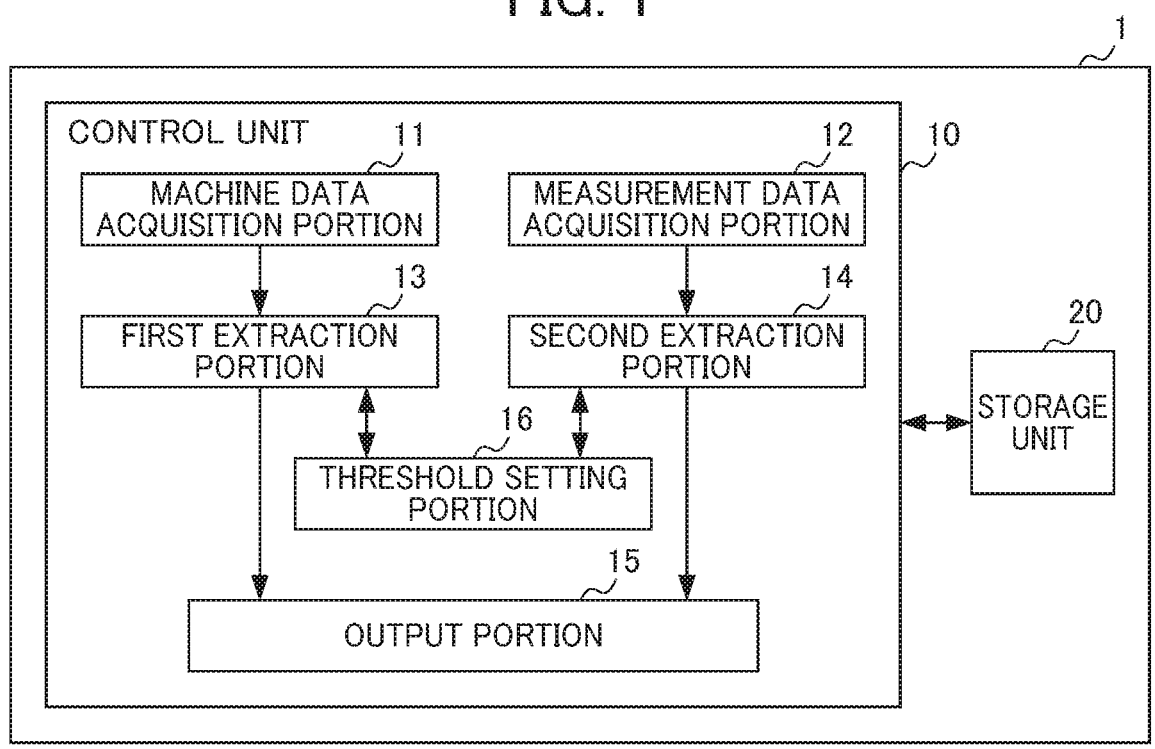
FIG. 1 is a view showing a functional configuration of a synchronizing device according to an embodiment.

Hereinafter, an example of an embodiment of the present invention will be explained. FIG. 1 is a view showing the functional configuration of a synchronizing device 1 according to the present embodiment. The synchronizing device 1 is an information processing device such as a personal computer or server device. In addition, the synchronizing device 1 may be implemented as a control device such as a numerical control device for controlling a machine tool. The synchronizing device 1 includes a control unit 10 and a storage unit 20, and in addition to these, may further include various interfaces such as I/O and communication.

The control unit 10 is a portion which controls the entirety of the synchronizing device 1, and realizes various functions of the present embodiment by reading out and executing software (synchronization program) stored in the storage unit 20 as appropriate. The control unit 10 may be a CPU.

The storage unit 20 is a storage region of various programs, various data, etc. for causing the hardware group to function as the synchronizing device 1, and may be ROM, RAM, flash memory, hard disk drive (HDD) or the like.

The control unit 10 includes a machine data acquisition portion 11, measurement data acquisition portion 12, first extraction portion 13, second extraction portion 14, output portion 15 and threshold setting portion 16.

The machine data acquisition portion 11 acquires at least one type of machine data related to operation of a machine in time series, based on the first time information. The first time information is managed by a control device of the machine tool, and the various types of machine data is associated with each other by the time information thereof, and are acquired at a predetermined sampling period. The machine data, for example, include command values and measured values of the torque, position, current, etc., for example. The acquired machine data is stored in the storage unit 20 along with the first time information.

The measurement data acquisition portion 12 acquires at least one type of measurement data measuring the state of the machine in time series, based on the second time information. The second time information is managed by a measurement system which is provided separately to the machine tool, and a plurality of types of measurement data is acquired at a predetermined sampling period to be associated with each other according to this time information. The measurement data includes acoustic data indicating the magnitude of sound, acceleration data indicating the vibration state, video data, etc., for example. The acquired measurement data is stored in the storage unit 20 together with the second time information. It should be noted that the installation location of sensors for measuring sound, vibration, etc. is not limited, and it is preferable to be the vicinity of the position at which machining is actually performed such as a spindle head part, for example.

The first extraction portion 13 extracts the moment at which a feature set in advance showing a predetermined event is expressed from any of the at least one type of machine data. The feature data is stored in advance in the storage unit 20. Predetermined event, for example, includes the timing of machining start at which the tool contacts the workpiece, timing of machining end at which tool is separated from the workpiece, or the like. During the occurrence of such an event, since the feature such as the torque command value suddenly rising can be seen, the first extraction portion 13 extracts the occurrence moment of the event with a feature such as at least a predetermined rate of increase, rate of decrease, exceeding or falling below a predetermined threshold, as a condition.

In addition, the first extraction portion 13, in the case of video data being included in the machine data which is the processing target, may extract the moment of a frame in which a feature set in advance showing a predetermined event is expressed among the frame images of this video data For example, the first extraction portion 13 can detect the timing at which the tool contacted the workpiece, timing at which separated therefrom, etc. by way of image analysis.

It should be noted that, in the case of a plurality of sets of machine data being acquired, if the occurrence moment of an event in any set of the machine data being extracted, the same moment is extracted based on the first time information for other sets of machine data.

The second extraction portion 14 extracts the moment at which a feature that was set in advance showing the same event as the first extraction portion 13 detects, from any of the at least one type of measurement data. The feature data is stored in advance in the storage unit 20. For example, from the timing of machining start at which the tool contacts the workpiece until the timing of machining end at which the tool is separated from the workpiece, the measured sound becomes great, and the acceleration also becomes great from the tool vibrating. Therefore, the second extraction portion 14, for example, extracts the moment of machining start with the magnitude of sound or acceleration exceeding a predetermined threshold as a condition, and extracts the moment of machining end with falling within the threshold over a fixed time period as a condition.

In addition, in the case of video data being included in the measurement data which is the processing target, similarly to the first extraction portion 13, the second extraction portion 14 may extract the moment of a frame in which the feature that was set in advance showing a predetermined event is expressed among the frame images of this video data.

It should be noted that, in the case of a plurality of sets of measurement data being acquired, when the occurrence moment of an event in any measurement data is extracted, the same moment is extracted based on the second time information for other sets of measurement data.

The output portion 15 synchronizes the moment extracted by the first extraction portion 13 and the moment extracted by the second extraction portion 14, and outputs the machine data and measurement data. The form of the data output from the output portion 15 is not limited. The output portion 15 may display on the display a plurality of waveform data aligned on the time axis, and may send such display data or numerical value data to an external device.

The threshold setting portion 16 sets a threshold for extracting the occurrence moment of a predetermined event from this machine data, based on the machine data before and after a time period in the first time information including the moment extracted from video data by way of the first extraction portion 13. In addition, the threshold setting portion 16 similarly sets a threshold for extracting the occurrence moment of a predetermined event from this measurement data, based on the measurement data before and after a time period in the second time information including the moment extracted from the video data by the second extraction portion 14.

It should be noted that the threshold may be set in advance statistically based on the machine data and measurement data upon repeatedly machining at the same conditions.

Figure 2:
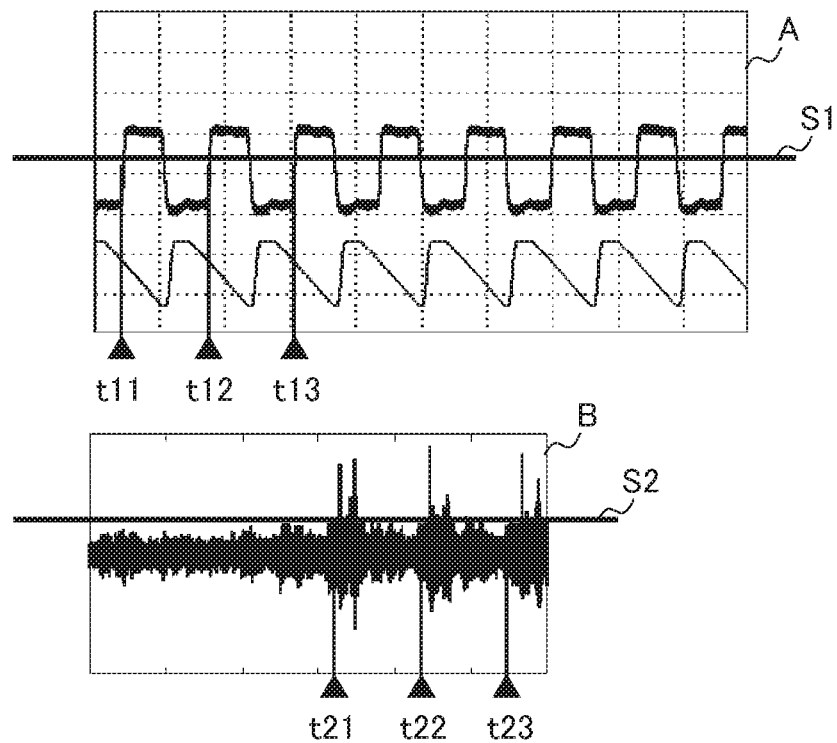
FIG. 2 is a view showing a display example of machine data and measurement data prior to synchronization, as a first example of a synchronization method according to the embodiment.

FIG. 2 is a view showing a display example of machine data and measurement data prior to synchronization as a first example of a synchronization method according to the present embodiment. In the first example, synchronization of the torque command value included in the machine data and acoustic data included in the measurement data is performed.

In order to detect the event of machining start in waveform A of the torque command value, when defining a threshold S1 set in advance, the moments t11, t12, t13, etc. at which exceeding this threshold S1 are extracted in order. In addition, in order to detect the event of machining start in a similar way in waveform B of acoustic data, if threshold S2 is set in advance, the moment t21, t22, t23, etc. at which exceeding threshold S2 are extracted in order also from these.

Herein, t11, t12, t13 are times based on the first time information, and t21, t22 and t23 are times based on the second time information. Therefore, since moments t11 and t21 are not equal, time is not synchronized between waveform A of machine data and waveform B of measurement data.

Figure 3:
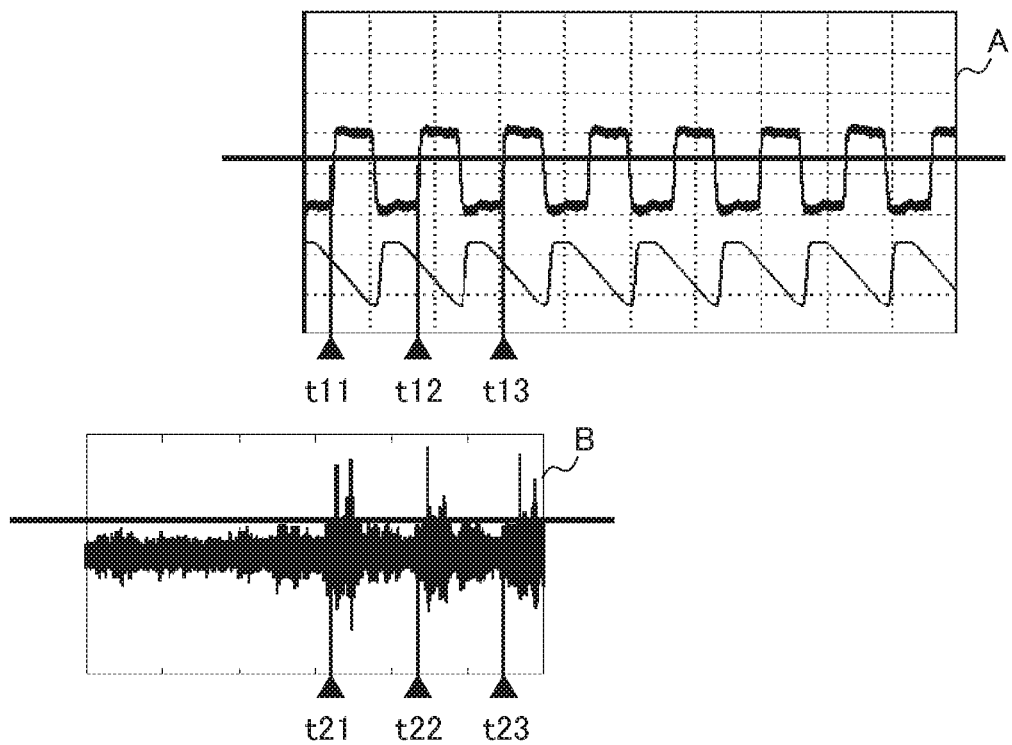
FIG. 3 is a view showing a display example of machine data and measurement data after synchronization, as a first example of a synchronization method according to the embodiment.

FIG. 3 is a view showing a display example of machine data and measurement data after synchronization as a first example of the synchronization method according to the present embodiment. From each of the machine data and measurement data in FIG. 2, the moments at which identical events occurred are extracted.

Relative to the moments t11, t12 and t13 extracted from the machine data, the moments t21, t22 and t23 extracted from the measurement data are respectively associated, and the waveform A and waveform B are displayed to be synchronized.

It should be noted that, in the first example, the synchronizing device 1 compares with the threshold the magnitude of sound by the acoustic data observed; however, a specific frequency component of the acoustic data may be selectively used.

FIG. 4 is a view showing a second example of the synchronization method according to the present embodiment. The second example is a case of acceleration data being used as the measurement data. According to the magnitude of acceleration, the magnitude of vibration at the spindle head, etc. is observed. Herein, the acceleration value during drilling is observed.

When a predetermined threshold is set in advance for this acceleration data, the time slots T1 to T5 in which the acceleration value is exceeding the threshold are extracted in order. It should be noted that the acceleration value of a short time falling below the threshold may be ignored. Alternatively, for example, the value arrived at by time averaging the acceleration value may be compared with the threshold.

According to the present embodiment, for the machine data and measurement data acquired based on the time information independent from each other, the synchronizing device 1 extracts the moments at which a feature indicating a predetermined event is expressed from each, thereby synchronizing these moments. The synchronizing device 1 can thereby synchronize and output a plurality of types of data of a time series.

More specifically, the synchronizing device 1 can easily extract the start and end of machining using the torque command value which is machine data, and the acoustic data or acceleration data which is measurement data, and can synchronize the machine data and measurement data. As a result thereof, upon analysis of examining the correlation between a plurality of types of data, the synchronizing device 1 can automatically provide temporally smoothed data.

The synchronizing device 1 can extract the moment at which an event occurs easily, by comparing the machine data and measurement data with predetermined thresholds. It should be noted that, so long as the difference, etc. in states of a machined surface is within a normal range of measurement error, since there will be no great change in the feature portion such as a rise in waveform, the synchronizing device 1 can regularly extract the moment at which an event occurred, without changing the threshold.

The synchronizing device 1 can extract the moment at which a predetermined event occurred by analyzing video data. As a result thereof, for example, even in a case of not being able to detect a specific event from the threshold in a group of machine data or a group of measurement data, it is possible to extract the moment at which this event occurred, and possible to share within a group associated by the same time information.

By extracting the moment at which a predetermined event occurred from the video data, the synchronizing device 1 can automatically set a threshold using the data of a time period before and after, relative to the machine data or measurement data for which a threshold is not set.

Although an embodiment of the present embodiment has been explained above, the present invention is not to be limited to the aforementioned embodiment. In addition, the effects described in the present embodiment are merely exemplifying the most preferred effects produced from the present invention, and the effects according to the present invention are not to be limited to those described in the present embodiment.

The synchronization method by the synchronizing device 1 is realized by way of software. In the case of being realized by way of software, programs constituting this software are installed to a computer (synchronizing device 1). In addition, these programs may be recorded on removable media and distributed to the user, or may be distributed by being downloaded to the user's computer via networks.

EXPLANATION OF REFERENCE NUMERALS

1 synchronizing device
10 control unit 11 machine data acquisition portion
12 measurement data acquisition portion
13 first extraction portion
14 second extraction portion
15 output portion
16 threshold setting portion
20 storage unit

What is claimed is:

1. A synchronizing device comprising:
a machine data acquisition portion configured to acquire at least one type of machine data related to an operation of a machine in a time series based on first time information, the first time information being managed by a control device of the machine;
a measurement data acquisition portion configured to acquire at least one type of measurement data measuring a state of the machine in the time series based on second time information, the second time information being managed by a system provided separately to the control device of the machine;
a first extraction portion configured to extract, from any of the acquired machine data, a first moment at which a first feature set in advance indicating a predetermined machining event of a workpiece is expressed;
a second extraction portion configured to extract, from any of the acquired measurement data, a second moment at which a second feature set in advance indicating the predetermined machining event of the workpiece is expressed; and
an output portion configured to synchronize the acquired machine data and the acquired measurement data by synchronizing the first moment and the second moment, and output the synchronized acquired machine data and acquired measurement data to indicate the predetermined machining event of the workpiece is expressed, wherein
the first feature set in advance or the second feature set in advance are set using the machine data or the measurement data that corresponds to a time period extracted from video data.

2. The synchronizing device according to claim 1, wherein
at least one of the first feature and the second feature includes a value of target data exceeding a predetermined threshold.

3. The synchronizing device according to claim 2, wherein
the first extraction portion and the second extraction portion, in a case of the video data being included in the acquired machine data or the acquired measurement data which are a processing target, are configured to extract from among frames images of the video data a frame moment of a frame in which a frame feature that was set in advance indicating the predetermined machining event is expressed.

4. The synchronizing device according to claim 3, further comprising
a threshold setting portion configured to set a threshold, based on the acquired machine data of a first time period of the first time information including a first frame moment extracted from the video data by the first extraction portion, or the acquired measurement data of a second time period of the second time information including a second frame moment extracted from the video data by the second extraction portion.

5. The synchronizing device according to claim 1, wherein
the acquired machine data includes a torque command value.

6. The synchronizing device according to claim 1, wherein
the acquired measurement data includes acoustic data which indicates a magnitude of sound.

7. The synchronizing device according to claim 1, wherein
the acquired measurement data includes acceleration data.

8. A synchronization method executed by a computer, the method comprising:
acquiring at least one type of machine data related to an operation of a machine in a time series, based on first time information, the first time information being managed by a control device of the machine;
acquiring at least one type of measurement data measuring a state of the machine in the time series, based on second time information, the second time information being managed by a system provided separately to the control device of the machine;
extracting, from any of the acquired machine data, a first moment at which a first feature that was set in advance indicating a predetermined machining event of a workpiece is expressed;
extracting, from any of the acquired measurement data, a second moment at which a second feature set in advance indicating the predetermined machining event of the workpiece is expressed; and
synchronizing the acquired machine data and the acquired measurement data by synchronizing the first moment and the second moment, and outputting the synchronized acquired machine data and acquired measurement data to indicate the predetermined machining event of the workpiece is expressed, wherein
the first feature set in advance or the second feature set in advance are set using the machine data or the measurement data that corresponds to a time period extracted from video data.

9. A non-transitory computer readable medium encoding a synchronization program for causing a computer to execute:
acquiring at least one type of machine data related to an operation of a machine in a time series, based on first time information, the first time information being managed by a control device of the machine;
acquiring at least one type of measurement data measuring a state of the machine in the time series, based on second time information, the second time information being managed by a system provided separately to the control device of the machine;
extracting, from any of the acquired machine data, a first moment at which a first feature that was set in advance indicating a predetermined machining event of a workpiece is expressed;
extracting, from any of the acquired measurement data, a second moment at which a second feature that was set in advance indicating the predetermined machining event of the workpiece is expressed; and
synchronizing the acquired machine data and the acquired measurement data by synchronizing the first moment and the second moment, and outputting the synchronized acquired machine data and acquired measurement data to indicate the predetermined machining event of the workpiece is expressed, wherein the first feature set in advance or the second feature set in advance are set using the machine data or the measurement data that corresponds to a time period extracted from video data.

10. The synchronizing device of claim 1, wherein the predetermined machining event is a timing at which the tool contacts the workpiece.

11. The synchronizing device of claim 1, wherein the predetermined machining event is a timing at which the tool separates from the workpiece.

12. The synchronization method of claim 8, wherein the predetermined machining event is a timing at which the tool contacts the workpiece.

13. The synchronization method of claim 8, wherein the predetermined machining event is a timing at which the tool separates from the workpiece.

14. The non-transitory computer readable medium encoding the synchronization program of claim 9, wherein the predetermined machining event is a timing at which the tool contacts the workpiece.

15. The non-transitory computer readable medium encoding the synchronization program of claim 9, wherein the predetermined machining event is a timing at which the tool separates from the workpiece.

* * * * *